March 10, 1942.  N. E. LINDENBLAD  2,275,635
HIGH VOLTAGE GENERATOR
Original Filed Aug. 9, 1933
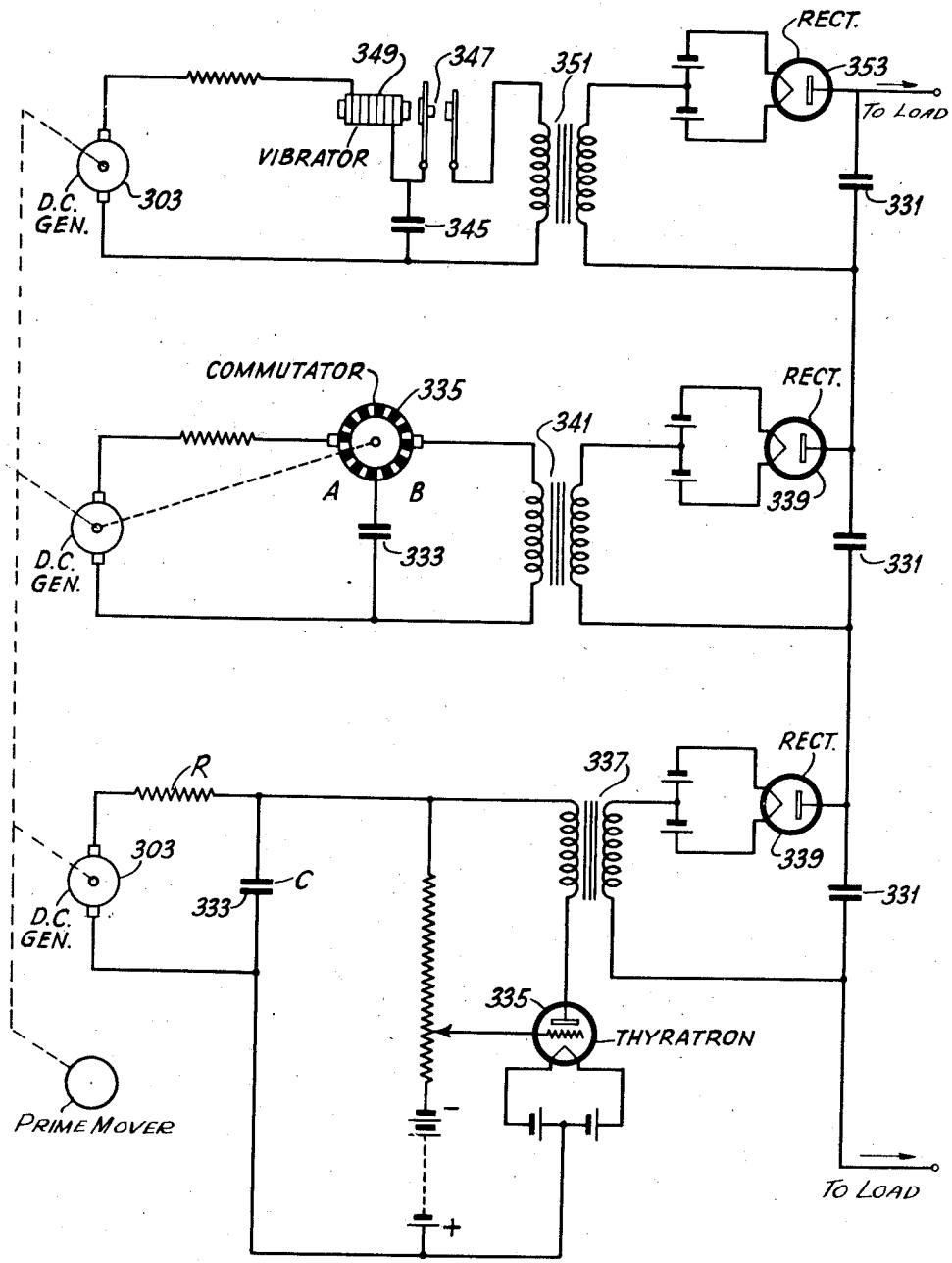
INVENTOR.
NILS E. LINDENBLAD
BY
ATTORNEY Patented Mar. 10, 1942

2,275,635

UNITED STATES PATENT OFFICE 2,275,635

HIGH VOLTAGE GENERATOR

Nils E. Lindenblad, Rocky Point, N. Y., assignor to Radio Corporation of America, a corporation of Delaware Original application August 9, 1933, Serial No. 684,328. Divided and this application January 23, 1940, Serial No. 315,280

4 Claims. (Cl. 171—97)

My present invention has as its main object the provision of methods and means for generating very high potentials or voltages at high energy levels.

In one way of carrying out my invention for the generation of high direct current voltages, I rotate a plurality of direct current generators from a common prime mover and charge metallic units by actual conductive contact with a direct current source. Then, by disconnecting the units from the source, the voltages of the charges thereon are increased in a manner which will be explained more fully hereinafter, and the charges are ultimately deposited upon a low voltage gradient-section of a charge-storing device or container.

This application is a division of my original copending application Serial No. 684,328, filed Aug. 9, 1933, now Patent #2,210,492, granted August 6, 1940, which contains claims directed to the rotatable devices, whereas this divisional application contains claims directed to a plurality of pulsating devices.

Objects of my present invention are to provide an improved belt system for generating high voltages; the individual elements of the system being arranged in such a way that the effective output voltage of the system is much higher than the voltage generated by any one element of the system; to provide a symmetrical network system in which various elements are separately charged but discharged in series so as to obtain a much higher resultant output voltage as compared to the voltage applied to each element; and many others which will be apparent as the description of my present invention proceeds. This description will be given in greater detail with the aid of the accompanying drawing which, however, is not to be considered in any way limitative of my present invention but is to be considered only illustrative. The drawing shows a circuit diagram wherein the high voltage generator comprises a plurality of pulsating devices.

In the figure, I have illustrated an arrangement for obtaining exceedingly high direct current voltages while using a minimum number of rotating direct current generators of the type such as illustrated in my copending application Serial No. 201,528, filed April 12, 1938. The arrangement of the system shown by the single figure in this application is given in diagrammatic form, it being understood that the generators 303 are of the type illustrated in the above mentioned copending application and are similarly mounted. Also, while only three stages have been shown, it should be clear that many more stages might be added. To obtain a high direct current voltage in each stage to serially charge up the output condensers 331, the bottom direct current generator may be fed into a resistance-condenser "thyratron" circuit as illustrated. The "thyratron" tube 335 is a thermionic discharge device which differs from the ordinary three-element electrode in that as soon as the positive anode current starts, the grid will no longer control the flow of anode current and the discharge will then only be stopped when the plate current is reduced to a desired value or stopped entirely. More information on the "thyratron" type of tube will be found in the General Electric Review, vol. 32, #4, April, 1929, page 213, in an article relating to hot cathode thyratrons, by A. W. Hull. When the conddenser 333 becomes charged to a certain value, the grid voltage will allow current flow through the tube 335 during a discharge of the condenser through the transformer 337. This discharge will be rectified by the rectifier 339 whose output voltage will be applied across the terminals of condenser 331. After a certain interval of time, the tube 335 will become non-conducting and the charging and discharging process will continue.

In the middle stage, the direct current generator 303 will feed a condenser 333 through a rotating commutator 335 so arranged that when there is contact at brush A to charge the condenser 333, there is a break at brush B and vice versa. As a result of this construction, the pulsating flow through transformer 341 of the middle stage will be rectified by the rectifier 339 charging up its corresponding output condenser 331. In the top stage, the vibrator arrangement acts in such a way that when the contact is open, the condenser charges up. Subsequently, when the contact closes, the condenser discharges through 351. This action, of course, repeats itself.

Clearly if desired the same type of pulsation producer may be used in each stage or any combination of systems may be used with any number of cascaded stages. Accordingly, my present invention is not to be considered limited by the various illustrations given but on the other hand is to be given the full scope indicated in the appended claims.

What is claimed is:

1. In a high voltage generator, a plurality of condensers connected in series to a load circuit and separate means for charging each of said condensers, each of said means including another condenser, a source of direct current for charging said other condenser, a transformer having a primary and a secondary winding and means for intermittently discharging said other condenser through said primary winding, said secondary winding being connected to said first mentioned condenser through a rectifier.

2. In a high voltage generator, a plurality of condensers connected in series to a load circuit and separate means for charging each of said condensers, each of said means including another condenser, a source of direct current for charging said other condenser, a transformer having a primary and a secondary winding and means for intermittently discharging said other condenser through said primary winding, said secondary winding being connected to said first mentioned condenser through a rectifier, said charging means for said first mentioned condenser being electrically isolated from each other.

3. In a high voltage generator, a plurality of condensers connected in series to a load circuit and separate means for charging each of said condensers, each of said means including another condenser, a source of direct current for charging said other condenser, a transformer having a primary and a secondary winding and means for intermittently discharging said other condenser through said primary winding, said secondary winding being connected to said first mentioned condenser through a rectifier, each of said sources of direct currrent comprising a direct current generator and all of said generators being driven from a prime mover through insulating driving means.

4. In a high voltage generator, a plurality of condensers connected in series to a load circuit and separate means for charging each of said condensers, each of said means including another condenser, a source of direct current for charging said other condenser, a transformer having a primary and a secondary winding and means for intermittently discharging said other condenser through said primary winding, said secondary winding being connected to said first mentioned condenser through a rectifier, said charging means for said first mentioned condenser being electrically isolated from each other, each of said sources of direct current comprising a direct current generator and all of said generators being driven from a prime mover through insulating driving means.

NILS E. LINDENBLAD.